H. M. QUACKENBUSH.
SCROLL-SAWING MACHINE.
No. 172,052. Patented Jan. 11, 1876.
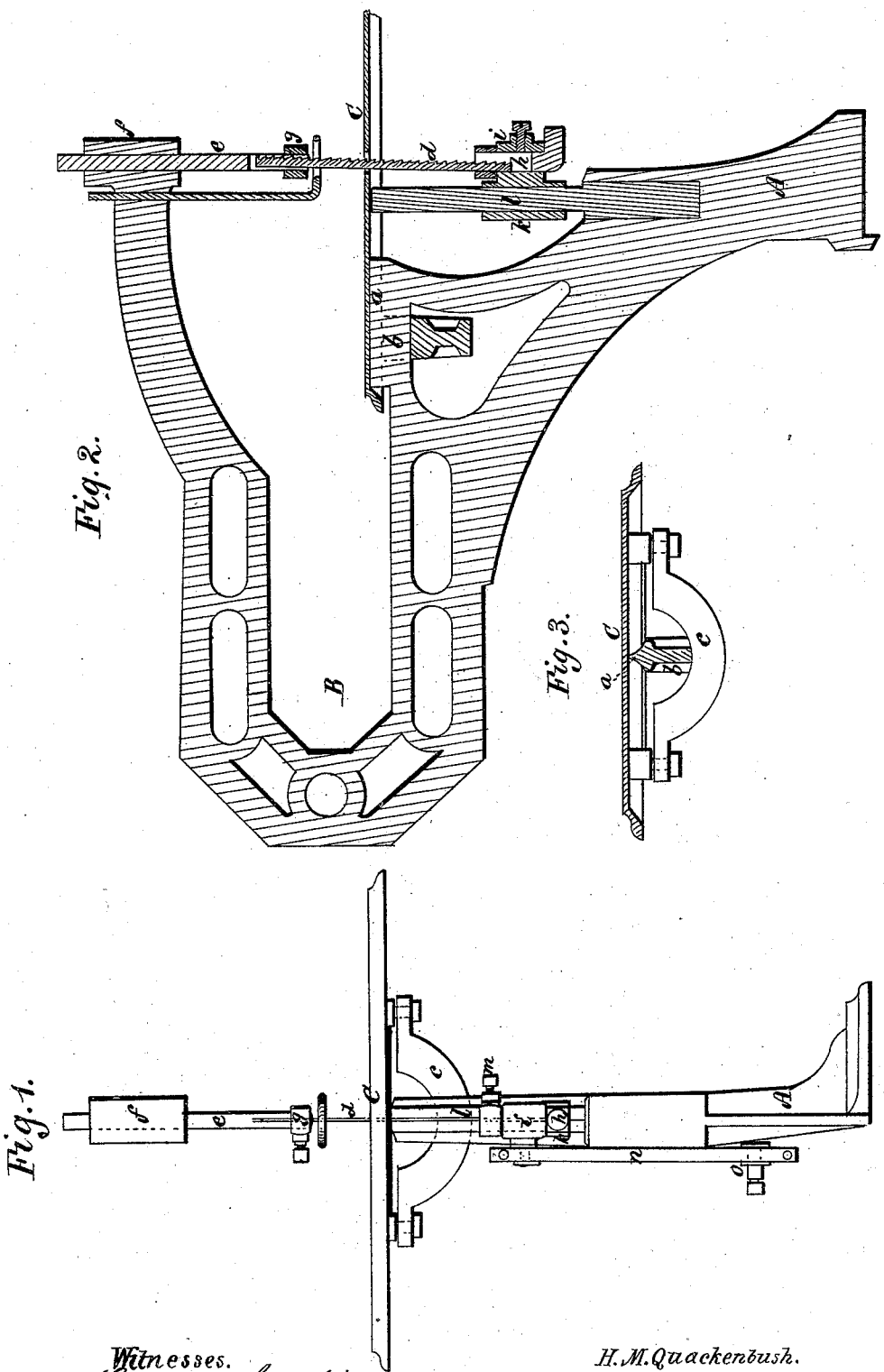
Witnesses.
Louis A. Curtis
W. Boardman
H. M. Quackenbush.
F. Curtis, Atty.

UNITED STATES PATENT OFFICE.

HENRY M. QUACKENBUSH, OF HERKIMER, NEW YORK.

IMPROVEMENT IN SCROLL-SAWING MACHINES.

Specification forming part of Letters Patent No. 172,052, dated January 11, 1876; application filed September 11, 1875.

*To all whom it may concern:*

Be it known that I, HENRY M. QUACKENBUSH, of Herkimer, Herkimer county, New York, have invented certain Improvements in Scroll-Sawing Machines, of which the following is a specification:

The drawings accompanying this specification represent, in Figure 1, a front elevation, in Fig. 2 a vertical and central section, and in Fig. 3 a view, of the table and its supporting mechanism.

In these drawings, which represent a saw and its supporting and operating mechanism adapted to a turning-lathe, A represents an upright post or standard, and B the supporting-frame or goose-neck, while C is the operating-table, upon which the wood to be sawed is placed.

The mode of attaching this table C to the standard A constitutes one feature of my present improvements; and consists in suspending or supporting such table, at its rear post, upon a narrow or sharp ledge, $a$, formed upon the top of a bar, $b$, making part of the upper portion of the standard, and confining the table rigidly and firmly, at any given angle, by means of a clamp composed of a semicircular plate, $c$, which is bolted at its ends to the under side of the table, and extends below and bears against the under side of the bar $b$.

By loosening the bolts the table is left free to be tilted or inclined laterally at any requisite angle, when it is desired to saw an object at a bevel, and when the desired angle is obtained the bolts are tightened, and the table clamped securely to the bar $b$. I am also enabled to instantly and readily "line up" or adjust the table to the saw, which is a matter of importance.

The saw is shown at $d$ as passing through a central hole in the table C, and confined at its upper end to a vertical guide-bar, $e$, which travels in a guideway formed in the head $f$ of the goose-neck B, the mode of confining the saw to the guide-bar consisting in inserting the former within a saw-kerf created in the lower end of the latter, and griping the two firmly together by a clamp, $g$, which encompasses the bar.

In this manner I avoid puncturing the saw with one or more holes, as is now generally practiced, and in so doing greatly strengthen it.

The lower end of the saw $d$ is received within a saw-kerf formed in the upper end of a vertical rod, $h$, which is inserted within a tubular stud, $i$, making part of a tubular block or carrier, $k$, that in turn encompasses and slides vertically upon an upright post or guide, $l$, erected upon the standard A below the table C.

The carrier $k$ is composed of two parts, one of which is bolted to the other, by which means a tight joint may always be preserved between it and the guide $l$. The rod $h$ is clamped securely within the bore of the stud $i$ by a bolt, $m$, and when this bolt is loosened the angle of the saw may be varied to any desired extent.

By this means I am enabled to saw a board much longer than could otherwise be done, as, if the saw remained at all times in line with the goose-neck B, the rear of the latter would obstruct a board of any considerable length.

By the herein-described method of confining the opposite ends of the saw I am enabled to run it without the tension which has heretofore been considered indispensable, and in so doing I dispense with several parts, and greatly lighten the remainder; and I am also enabled, by raising the lower clamp upon the saw, or lowering the upper one, to shorten and greatly stiffen the saw between these points, when thin stock is to be sawed.

To connect the saw with the face-plate of a lathe I employ a pitman, $n$, the upper end of which is pivoted to one side of the carrier $k$, while its lower end is provided with a horizontal stud, $o$, that enters the radial slot in said face-plate. By placing this stud or wrist-pin $o$ nearer to or more remote from the arbor of the lathe, the length of stroke of the saw is varied at pleasure. The pitman $n$ is composed of two bars of wood, suitably bolted together at the ends.

By this means I obtain lightness, stiffness, and cheapness; and I am enabled to readily preserve a tight bearing about the pivot which connects the pitman with the carrier $k$.

I claim—

1. The combination of the standard $l$, carrier $k$, tubular stud $i$, and split rod $h$, said parts being arranged to support and clamp the lower end of the saw, substantially as set forth.

2. The combination, with the described devices for clamping the lower end of the saw, of the reciprocating rod $e$, split at its lower end, and the clamp $g$ adjustable thereon, substantially as and for the purposes set forth.

3. The table C in combination with the central support $b$ $a$ and yoke $c$, united adjustably with the table by bolts, as shown and set forth.

HENRY M. QUACKENBUSH.

Witnesses:
 F. CURTIS,
 WM. SMITH,
 W. W. RASBACH.